Patented June 22, 1948

2,443,923

UNITED STATES PATENT OFFICE 2,443,923

POLYVINYL ALCOHOL ESTERS OF MERCAPTO CARBOXYLIC ACIDS AND PRODUCTS THEREFROM

Carl Walter Mortenson, Wilmington, Del., assignor to E. I. du Pont de Nemours & Company, Wilmington, Del., a corporation of Delaware No Drawing. Application February 23, 1944, Serial No. 523,578

6 Claims. (Cl. 260—79)

This invention relates to the insolubilization of polyvinyl alcohols. More particularly, it refers to the preparation of certain esters of polyvinyl alcohols and their insolubilization.

The insolubilization of polyvinyl alcohol itself with conventional agents, such as dimethylolurea and trimethylolmelamine, is well known. These reagents, while satisfactory for certain applications, produce an insoluble polyvinyl alcohol only after treatment of the shaped article at elevated temperatures. There is a need for new and more effective methods of insolubilization for use in applications of polyvinyl alcohols demanding a high degree of water resistance. There is, furthermore, a particular need for agents which will produce a high degree of insolubility by reaction with polyvinyl alcohols at ordinary temperatures, especially during the final stages in the manufacture of shaped, insoluble articles.

This invention has, therefore, as an object, a process for insolubilization of polyvinyl alcohols. A further object is the preparation of shaped, insolubilized polyvinyl alcohol articles having high resistance to swelling in water. A still further object comprises a new class of polyvinyl alcohol derivatives which may be insolubilized at ordinary temperatures. Other objects will appear hereinafter.

These objects are accomplished by the following invention wherein a polyvinyl alcohol, preferably a hydrolyzed ethylene-vinyl acetate interpolymer, is esterified with a mercapto carboxylic acid and the resulting mercapto ester is subjected to oxidizing conditions. A preferred aspect of the invention is the class of mercaptocarboxylic acid esters of hydrolyzed ethylene-vinyl acetate interpolymers and their insoluble oxidation products.

Insolubilization of polyvinyl alcohols by the present invention is accomplished by (1) treating a solution of the polyvinyl alcohol with a mercapto acid and (2) exposing the resultant thiol-containing ester to an oxidizing agent such as air. To hasten esterification which occurs in the first stage of the modification, the mixture is usually heated with stirring at 90–110° C. in the presence of an acidic catalyst such as hydrochloric acid. Films, coatings, or threads and the like of the desired dimensions are then prepared from the bubble-free solution by casting or spinning methods as required. Films flowed from such reaction mixtures soon become insoluble on standing in air at ordinary temperatures. In this second stage of modification, catalysts such as iodine, peroxides, or an orthodox drying oil catalyst such as cobalt naphthenate may be added to hasten the air oxidation which is believed to result in disulfide linkages between two or more molecules and, thereby, insolubilization. The insolubilized films show good resistance to boiling water and are equally as water resistant as polyvinyl alcohol films modified by reaction at elevated temperatures with conventional insolubilizing agents such as formaldehyde, dimethylolurea or trimethylolmelamine. A particular advantage of the present invention, therefore, is that insolubilization may be effected at ordinary temperatures. This is of particular value in applications of the polyvinyl alcohol in which use of heat is undesirable because of possible injury to the final article, as, for example, in the manufacture of certain paper articles. Another advantage of the invention lies in the fact that the esterification proceeds in aqueous systems in which the polyvinyl alcohol is readily soluble. The final shaped articles can be cast readily from the reaction medium. While the degree of water resistance obtained through air drying of the mercapto acid derivatives is adequate for most purposes, it may be further increased by a heat treatment, for example, at 60–100° C.

The preferred amounts of mercapto acids to be used vary depending upon a number of factors, including after-treatment and application of the final oxidized product. In general, however, good insolubility is realized using 20% by weight of a mercapto acid based on the weight of solid polyvinyl alcohol. Preferred mercapto acids are aliphatic acids containing ten carbon atoms or less and at least one thiol group, examples of which are mercaptoacetic acid (thioglycolic acid), 5-mercaptovaleric acid, and 7-mercaptoheptanoic acid. Other suitable mercaptocarboxylic acids are given below.

The more detailed practice of the invention is illustrated by the following examples, wherein parts given are by weight. There are, of course, many forms of the invention other than these specific embodiments.

Example I

Five parts of polyvinyl alcohol obtained by the complete hydrolysis of polyvinyl acetate is heated with one part of mercaptoacetic acid at 90° C. for 30 minutes using 25 parts of 0.33 N hydrochloric acid both as a solvent and catalyst. The reaction product is a clear, homogeneous, light colored solution. If this reaction mixture is cast into thin films on glass plates or other suitable casting surfaces and the solvent is allowed to evaporate, sheets are obtained which, after oxidation, as by exposure to air, are insoluble in boiling water. Such films possess tensile strengths of about 5500 lb./sq. in. at 165% break elongation. When these unbaked, insolubilized films are immersed in water for five minutes and then tested when wet, tensile strengths of about 800 lbs./sq. in. at 65% break elongation are observed. These are comparable to the wet tensile strengths of heat-treated films insolubilized with dimethylolurea or trimethylolmelamine. If desired, a still further improvement may be obtained by heating dried, insoluble films at 100° C. for one hour, or by treatment with hydrogen peroxide with or without heat treatment.

The unoxidized reaction product dissolves readily in 5% sodium hydroxide. Treatment of such alkaline solutions with iodine, air, or oxygen results in precipitation of water-insoluble products.

Example II

Ten parts of a hydrolyzed ethylene/vinyl acetate interpolymer (containing before hydrolysis about 95% by weight of vinyl acetate) and 15 parts of mercaptoacetic acid are heated under reflux in 50 parts of 0.33 N hydrochloric acid for two hours. The clear, viscous reaction mixture is filtered while hot and allowed to stand until bubble-free. A film of one mil thickness is cast on glass and allowed to dry at room temperature. After exposure to air overnight, this film is insoluble in boiling water. Even after one hour immersion in boiling water, the film retains its shape and does not become greatly swollen, stringy or gummy or dissolve as does an unmodified film of corresponding dimensions. Likewise, the film does not dissolve or swell appreciably in methanol/water mixtures.

Example III

To a suspension of 22 parts of polyvinyl alcohol in 90 parts of xylene is added 6.7 parts of 5-mercaptovaleric acid. This mixture is heated under nitrogen at 150° C. with stirring. Heating is continued until all water formed by esterification is removed by distillation of a water/xylene binary, the xylene being returned continuously to the reaction mixture after separation from the water layer in the distillate. The colorless reaction product is filtered, washed with benzene and dried. This product is insoluble in most organic solvents, but dissolves in water, water/alcohol mixtures, and in alkaline solutions such as 5% sodium hydroxide. From aqueous or alcohol/water solutions shaped articles, such as films, may be readily obtained. After exposure to air for 2-6 hours, such films become insoluble in water and alkali and possess water resistance comparable to corresponding films insolubilized with dimethylolurea. Likewise, after immersion of the film in ethyl alcohol containing 1% of hydrogen peroxide, followed by a heat-treatment at 100° C. for 30 minutes, an insoluble film is obtained. This film retains its shape even after one hour in boiling water and has a wet tensile strength of 1250 lbs./sq. in. at 50% break elongation.

Example IV

A polymer is prepared by substantially complete hydrolysis of an ethylene/vinyl acetate interpolymer having an ethylene to vinyl acetate mol ratio of 3:1, which corresponds to a weight ratio of about 1:1. Forty-three parts of this polymer is suspended in 150 parts of xylene, and 20 parts of mercaptoacetic acid is added. Esterification is carried out as in Example III. The polymeric ester is soluble in xylene/amyl alcohol mixtures and is readily formed into clear films which, after exposure to air for a few hours, are insoluble in water or xylene/amyl alcohol mixtures and retain their shape after one hour's exposure to boiling water or alcohol/water mixtures.

The foregoing examples serve only to illustrate the preferred embodiments of the invention. In its broadest scope the invention is applicable to the reaction of any polyvinyl alcohol with any mercapto carboxylic acid.

Among the types of polyvinyl alcohols which may be rendered insoluble by reaction with mercapto acids and oxidation of the resulting product, may be mentioned polyvinyl alcohol itself, prepared by complete saponification of polyvinyl acetate, and also polyvinyl alcohols prepared by partial hydrolysis of polyvinyl acetate. Any desired kind of polyvinyl alcohol of any conventional viscosity may be employed in this invention. These types of polyvinyl alcohols may be employed in either aqueous or organic media. However, if partially hydrolyzed products are to be used in aqueous media it is, of course, necessary that the hydrolysis be carried out to the extent that water solubility be produced. Mixtures of water and organic solvents may be employed as well as mixtures of organic solvents. Other types of polyvinyl alcohols not necessarily water soluble, but nevertheless operable in this invention, are partially or completely hydrolyzed copolymers of ethylene and vinyl acetate, hydrolyzed copolymers of vinyl chloride and vinyl acetate, hydrolyzed vinyl propionate/vinyl chloride copolymers, hydrolyzed vinyl acetate/styrene copolymers, hydrolyzed vinyl acetate/acrylonitrile copolymers, and hydrolyzed vinyl acetate/vinylidene chloride copolymers.

Also operable are polyvinyl alcohol derivatives in which the hydroxyls are partially reacted with aldehydes or ketones giving hydroxyl-containing polyvinyl acetals. For example, polyvinyl alcohol may be reacted partially with formaldehyde, acetaldehyde, butyraldehyde, benzaldehyde or ketones such as cyclohexanone, methyl cyclohexanone, or acetophenone, producing derivatives still containing free hydroxyl groups.

Hydrolyzed ethylene/vinyl acetate polymers are preferred for reaction with mercapto acids because the mercaptocarboxylic acid esters of hydrolyzed ethylene/vinyl acetate interpolymers substantially retain the desirable characteristics of the starting materials, among which may be mentioned low water sensitivity, good toughness at low temperature, and improved compatibility with water-insoluble plasticizers. In these respects, the mercaptocarboxylic acid esters of hydrolyzed ethylene/vinyl acetate interpolymers are in general superior to the corresponding esters of polyvinyl alcohol. Furthermore, these copolymers permit the production of esters of varying degree of solubility in organic solvents or water, depending upon the relative proportions of ethylene and vinyl acetate in the non-hydrolyzed polymers. The interpolymers and their mercaptocarboxylic acid esters can be melt-spun to form fibers.

Hydrolyzed ethylene/vinyl acetate interpolymers form the subject of several copending applications, in particular, application S. N. 446,114, filed by J. R. Roland on June 6, 1942, and now abandoned.

The hydrolyzed ethylene/vinyl acetate interpolymers suitable for treatment according to this invention may contain as little as 1% by weight and as much as 99% by weight of polyvinyl alcohol residues. The preferred products are those obtained by hydrolyzing vinyl ester/ethylene interpolymers in which the mol ratio of vinyl ester to ethylene is in the range between 1:3 and 3:1, which is equivalent in the case of vinyl acetate/ethylene interpolymers to about 50–90% by weight of vinyl acetate. If desired, the hydrolysis can be stopped short of completion, e. g., when about 80–95% of the ester groups have been replaced by hydroxyl groups. Preferably, however, the interpolymer is substantially completely hydrolyzed since it is more stable in that form.

The mercapto acids which are operable under this invention may contain one or more thiol groups and may be mono- or polybasic in nature. They may also contain other functional groups such as halogen atoms, nitro or nitrile groups. Likewise, the mercapto acid may contain olefinic bonds. It may be an aliphatic, alicyclic, or aromatic acid. The preferred mercapto acids are aliphatic carboxylic acids containing up to ten carbon atoms, one thiol group being substituted for a hydrogen atom of a methylene group. Included among these are mercaptoacetic acid (thioglycolic acid), 3-mercaptopropionic acid, 5-mercaptovaleric acid, 10-mercaptodecanoic acid, 7-mercaptoheptanoic acid, 4-mercaptopimelic acid, beta-mercaptobutyric acid, and alpha-mercaptoisobutyric acid. In further illustration of mercapto acids which may be used the following may be mentioned: para-mercaptobenzoic acid, ortho-mercaptocinnamic acid, alpha-mercaptodiphenylacetic acid, alpha- or beta-mercaptohydrocinnamic acid, 2-mercaptonicotinic acid, ortho-mercaptophenylacetic acid, 4-mercaptophthalic acid, 3-mercapto-ortho-toluic acid, and thiomalic acid.

Mercapto acids such as those which result upon addition of hydrogen sulfide to unsaturated drying oil acids (U. S. 2,137,584) and unsaturated mercapto acids such as those from reaction of hydrogen sulfide with abietic acid (U. S. 2,052,210) may also be used. Mercaptoacetic acid is especially preferred because of its low cost and availability.

In carrying out the esterification, water is preferred as a reaction medium, especially when both the polyvinyl alcohol and mercapto acid are water soluble. However, the invention is not limited to any particular process of esterifying polyvinyl alcohol itself or other polyvinyl alcohols with the said mercapto acids. Thus media other than water, such as dioxan, chloroform, hydrocarbons, halogenated hydrocarbons, or mixtures of these may be employed depending upon the polyvinyl alcohol and mercapto acid selected. For certain applications reaction of the polyvinyl alcohol and mercapto acid may be carried out in the absence of solvents. For example, plasticized polyvinyl alcohol products, after blending with the mercapto acid on a relatively cool rubber mill, may be molded, calendered or sheeted and then insolubilized by air drying or baking.

In most cases, however, it is preferred to carry out the initial reaction of the polyvinyl alcohols with mercapto acids in solution, heating for a short time (0.5–4 hrs.) at a temperature of 60–100° C. until a homogeneous solution is obtained. The reaction conditions in this stage are not necessarily restricted to these limits. For practical purposes the upper temperature limit of the reaction is the boiling point of the reaction mixture, and the length of time involved is variable and need be only that sufficient to produce homogeneous solutions. Generally, an acidic catalyst such as hydrochloric, sulfuric, or p-toluenesulfonic acid is used in the esterification stage of the reaction. In many instances the desired degree of esterification may also be obtained by stirring the polyvinyl alcohol and the mercapto acid at room temperature until homogeneous solutions of the reactants are obtained, casting films on appropriate surfaces, and heating these films containing the polyvinyl alcohol and unchanged mercapto acids. During this heat treatment esterification and insolubilization occur simultaneously. In such a procedure it is advisable to use a mercapto acid having a boiling point above 100° C.

The extent of esterification of the polyvinyl alcohol with the mercapto acid may vary over wide limits, depending upon the degree of insolubility desired. To obtain effective insolubilization esterification must be carried out to such an extent that at least three thiol groups are present in each molecule of the polyvinyl alcohol. The degree of esterification obviously depends on the particular polyvinyl alcohol and mercapto acid used, the relative proportions of each, the catalyst, time, and temperature of reaction. Likewise, insolubilization may be obtained in varying degrees depending upon the extent of esterification of the polyvinyl alcohol. Usually 5–30% of mercaptocarboxylic acid (based on the weight of the polyvinyl alcohol) is sufficient to obtain esters which become highly insoluble on oxidation, but the amount may vary between the limits 2–100% or more depending upon the polyvinyl alcohol employed, the molecular weight of the particular mercapto acid used, the reaction conditions, and the degree of insolubility desired. In order to get complete esterification it is necessary to esterify in non-aqueous media and remove water of esterification as it is formed. However, since polyvinyl alcohols are applied mainly from aqueous solutions, it is preferable to introduce only sufficient mercaptan groups into the polyvinyl alcohol so that by oxidation the product may be crosslinked and insolubilized effectively.

When reaction of the alcohol and acid is carried out in an aqueous system, the esterification is preferably stopped short of the point where water-insoluble thiol-containing polymeric esters are formed. The water-soluble polymeric esters may be used in the preparation of the desired shaped article by casting, extruding, dipping, spraying or spreading. Oxidation of the shaped article renders it water-insoluble.

In certain cases it is desirable to isolate the intermediate polymeric ester for use in the formation of molded articles. This may be accomplished by diluting the reaction mixture with non-solvents such as methanol, ethanol, or dioxan. The precipitate formed may be washed with an organic solvent such as acetone, dioxan or ethanol and dried. It may then be made up into fresh solutions or milled directly on rubber rolls with plasticizer and other ingredients or used directly as a molding composition.

The temperature and the time employed during the drying and/or baking of the polyvinyl alcohol ester (baking is not essential, but it is sometimes desirable) may be varied widely depending upon the degree of modification desired. Frequently it is desirable to heat the ester at relatively low temperatures, e. g., 60–80° C., or to apply heat slowly, gradually raising the temperature to 100–150° C. in order to avoid excessive reaction between the polyvinyl alcohol and residual acids, such as hydrochloric acid used as catalysts in the esterification stage of the modification. Again, it may be desirable to use no heat treatment. Prior to the shaping of articles the reaction mixtures may be neutralized and acid acceptors such as organic tertiary amines like pyridine, quinoline, triethylamine, or triethanolamine or inorganic bases such as sodium bicarbonate, sodium hydroxide, or sodium carbonate may be used. By the use of such procedures it is possible to coat polyvinyl alcohol on cellulosic substrates and to insolubilize the polyvinyl alcohol by this invention without tenderizing the fabric.

Oxidation of the mercapto esters is conveniently carried out by exposure to air or oxygen, but other oxidizing agents can be used such as hydrogen peroxide, chlorine water, ozone, etc. Insolubilization by oxidation may be accelerated by catalysts which can be incorporated after esterification has been effected. Such catalysts include iodine, peroxides such as benzoyl peroxide, sodium peroxide, or hydrogen peroxide, or drying oil oxidation catalysts employed in the paint and varnish industry such as lead, manganese, cobalt, iron, nickel and chromium salts of long chain acids. For example, the iron, cobalt, or lead salts of linoleic acid dissolved in an appropriate solvent are effective catalysts in amounts as low as 0.1% based on the polyvinyl alcohol employed. By "insolubilization" is means that the oxidized product is insoluble in a solvent (water or organic solvent) in which the mercaptocarboxylic acid ester was soluble before being subjected to the oxidizing treatment.

The above description and examples are intended to be illustrative only. Any modification thereof or variation therefrom which conforms to the spirit of the invention is intended to be included within the scope of the claims.

What is claimed is:

1. Process of preparing hydrolyzed ethylene-vinyl acetate interpolymer derivatives capable of insolubilization on exposure to air, which comprises reacting, at a temperature of 60–150° C. and in the presence of an acidic catalyst, a hydrolyzed ethylene-vinyl acetate interpolymer with a mercaptocarboxylic acid which is, apart from the mercaptan and carboxyl groups, hydrocarbon.

2. Process of preparing hydrolyzed ethylene-vinyl acetate interpolymer derivatives capable of insolubilization on exposure to air, which comprises reacting, at a temperature of 60–150° C. and in the presence of an acidic catalyst, a hydrolyzed ethylene-vinyl acetate interpolymer with mercaptoacetic acid.

3. A mercaptocarboxylic acid ester of a hydrolyzed ethylene-vinyl acetate interpolymer.

4. A mercaptoacetic acid ester of a hydrolyzed ethylene-vinyl acetate interpolymer.

5. The insoluble air oxidation product of a mercaptocarboxylic acid ester of a hydrolyzed ethylene-vinyl acetate interpolymer.

6. The insoluble air oxidation product of a mercaptoacetic acid ester of a hydrolyzed ethylene-vinyl acetate interpolymer.

CARL WALTER MORTENSON.

REFERENCES CITED

The following references are of record in the file of this patent:

UNITED STATES PATENTS

| Number | Name | Date |
| --- | --- | --- |
| 2,377,868 | D'Alelio | June 12, 1945 |
| 2,418,938 | Izard | Apr. 15, 1947 |

FOREIGN PATENTS

| Number | Country | Date |
| --- | --- | --- |
| 381,551 | Italy | July 11, 1940 |